US006456991B1

United States Patent
Srinivasa et al.

(10) Patent No.: US 6,456,991 B1
(45) Date of Patent: Sep. 24, 2002

(54) CLASSIFICATION METHOD AND APPARATUS BASED ON BOOSTING AND PRUNING OF MULTIPLE CLASSIFIERS

(75) Inventors: Narayan Srinivasa, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 09/388,858

(22) Filed: Sep. 1, 1999

(51) Int. Cl.[7] .................................................. G06N 3/02
(52) U.S. Cl. ............................. 706/20; 706/16; 706/25; 704/9
(58) Field of Search .............................. 706/20, 16, 25; 704/9

(56) References Cited

U.S. PATENT DOCUMENTS

| | | | |
|---|---|---|---|
| 4,876,731 A | | 10/1989 | Loris et al. |
| 4,914,708 A | | 4/1990 | Carpenter et al. |
| 5,058,180 A | | 10/1991 | Khan |
| 5,636,326 A | | 6/1997 | Stork et al. |
| 5,812,992 A | | 9/1998 | de Vries |
| 5,819,247 A | * | 10/1998 | Freund et al. ................. 706/25 |
| 5,822,741 A | * | 10/1998 | Fischthal ..................... 706/16 |
| 5,859,925 A | | 1/1999 | Yaeger et al. |
| 5,914,708 A | | 6/1999 | La Grange et al. |
| 6,253,169 B1 | * | 6/2001 | Apte et al. ...................... 704/9 |

OTHER PUBLICATIONS

Wei Fan, Salvatore J. Stolfo, Junxin Zhang, The application of AdaBoost for distributed, scalable and on–line learning, Proceedings of the fifth ACM SIGKDD international conference on Knowledge discovery and data mining, Aug. 1999, pp. 362–366.*

Yoav Freund and Robert E. Schapire, A short introduction to boosting, Journal of Japanese Society for Artificial Intelligence, 14(5):771–780, Sep., 1999. (Appearing in Japanese, translation by Naoki Abe.).*

F. Hoffmann, Boosting a Genetic Fuzzy Classifier, IFSA/NAFIPS 2001, Vancouver, Canada, Jul. 25–28th, 2001, pp. 1–6.*

Jonas S. Karlsson, Martin L. Kersten, O–Storage: A Self Organizing Multi–Attribute Storage Technique for Very Large Main Memories, Australasian Database Conference 2000: 57–64.*

(List continued on next page.)

*Primary Examiner*—Wilbert L. Starks, Jr.
(74) *Attorney, Agent, or Firm*—Tope-McKay & Associates (57) ABSTRACT

A boosting and pruning system and method for utilizing a plurality of neural networks, preferably those based on adaptive resonance theory (ART), in order to increase pattern classification accuracy is presented. The method utilizes a plurality of N randomly ordered copies of the input data, which is passed to a plurality of sets of booster networks. Each of the plurality of N randomly ordered copies of the input data is divided into a plurality of portions, preferably with an equal allocation of the data corresponding to each class for which recognition is desired. The plurality of portions is used to train the set of booster networks. The rules generated by the set of booster networks are then pruned in an intra-booster pruning step, which uses a pair-wise Fuzzy AND operation to determine rule overlap and to eliminate rules which are sufficiently similar. This process results in a set of intra-booster pruned booster networks. A similar pruning process is applied in an inter-booster pruning process, which eliminates rules from the intra-booster pruned networks with sufficient overlap. The final, derivative booster network captures the essence of the plurality of sets of booster networks and provides for higher classification accuracy than available using a single network.

32 Claims, 7 Drawing Sheets

OTHER PUBLICATIONS

Say Wei Foo; Eng Guan Lim, Speaker recognition using adaptively boosted classifier, Electrical and Electronic Technology, 2001. TENCON. Proceedings of IEEE Region 10 International Conference on, vol.: 1, Aug. 19–22, 2001, pp.: 442–446.*

Murphey, Y.L.; Zhihang Chen; Hong Guo, Neural learning using AdaBoost, Neural Networks, Jul. 15–19, 2001, Proceedings. IJCNN '01. International Joint Conference on, vol.: 2, 2001 pp.: 1037–1042 vol. 2.*

Zhao, Q.; Principe, J.C., Support vector machines for SAR automatic target recognition, Aerospace and Electronic Systems, IEEE Transactions on, vol.: 37 Issue: 2, Apr. 2001, pp.: 643–654.*

Schwenk, H., Using boosting to improve a hybrid HMM/neural network speech recognizer, Acoustics, Speech, and Signal Processing, 1999. Proceedings., 1999 IEEE International Conference on, vol.: 2, Mar. 15–19, 1999, pp.: 1009–1012, vol. 2.*

T.W. Freeman, K. Tanaka, J. Ohta, and K. Kyuma, "Computer Vision for Computer Games", IEEE2nd Intl. Conf. On Automatic Face and Gesture Recognition, 1996.

H. Drucker, R. Schapire, and P. Simard, "Boosting Performance in Neural Networks", International Journal of Pattern Recognition and Artificial Intelligence vol. 7, No. 4 (1993) 705–719.

N. Srinivasa, "Learning and Generalization of Noisy Mapping Using a Modified PROBART Neural Network", IEEE Transactions on Signal Processing vol. 45, No. 10, pp. 2533–2550, Oct. 1997.

G.A. Carpenter, S. Grossberg, N.Markuzon, J.H. Reynolds, and D.B. Rosen, "Fuzzy Artmap: A Neural Network Architecture for Incremental Supervised Learning of Analog Multidimensional Maps", IEEE Transactions on Neural Networks, vol. 2, pp. 698–712, 1992.

S. Shafer et al., "The new easylifing project at Microsoft research", Jul. 1998, Smart Spaces Workshop.

N. Srinivasa and N. Ahuja, "A topological and temporal correlator network for spatiotemporal pattern learning, recognition, and recall", Mar. 1999, IEEE Transaction on Neural Networks, vol. 10, No. 2, pp. 356–371.

S. Niyogi and W.T. Freeman, "Example–Based Head Tracking", IEEE 2nd Intl. Conf. On Automatic Face and Gesture Recognition, Oct. 1996.

K. Kyuma et al., "Artificial retinas—fast, versatile image processors", 1994, Nature: Intl. Weekly Journal of Science.

Y. Aloimonos and A. Rosenfeld, "Computer Vision", Science, Sep. 13, 1991, p. 1249.

* cited by examiner

| Method | Recognition | | Out of position | |
|---|---|---|---|---|
| | Acc. (%) | Rules | Acc. (%) | Rules |
| Single M-PROBART network | 98.2 | 2230 | 98.1 | 2180 |
| Directly pruned single M-PROBART network | 95.7 | 327 | 98.3 | 253 |
| Boosting with only intra-booster pruning with M-PROBART networks | 99.0 | 905 | 99.1 | 480 |
| Boosting, with intra and inter-booster pruning with M-PROBART networks (method of the present invention) | 99.0 | 456 | 99.0 | 337 |
| C5 | 98.1 | 380 | 97.0 | 280 |

FIG. 7

CLASSIFICATION METHOD AND APPARATUS BASED ON BOOSTING AND PRUNING OF MULTIPLE CLASSIFIERS

TECHNICAL FIELD

The present invention relates to neural networks used for pattern recognition. More particularly, the invention disclosed herein provides a highly accurate classification method and apparatus for position and recognition sensing which uses a boosting and pruning approach for adaptive resonance theory (ART) based neural networks. The present invention is chiefly applicable to pattern recognition problems such as automobile occupant type and position recognition and hand signal recognition.

BACKGROUND OF THE INVENTION

In the recent past, research has been applied to the use of artificial neural networks (ANN) as a nonparametric regression tool for function approximation of noisy mappings. ANNs have been successfully applied in a large variety of function approximation applications including pattern recognition, adaptive signal processing, and the control of highly nonlinear dynamic systems. In pattern recognition applications, ANNs are used to construct pattern classifiers that are capable of separating patterns into distinct classes. In signal processing and control applications ANNs are used to build a model of physical system based on data in the form of examples that characterize the behavior of the system. In this case, the ANN is essentially used as a tool to extract the mapping between the inputs and outputs of the system without making assumptions about its functional form.

The most common type of ANN used in function approximation problems is the feedforward type. Although these networks have been successfully used in various applications, their performance is dependent on a problem-specific crafting of network architecture (e.g. the number of hidden layers and the number of nodes in each hidden layer) and network parameters (e.g. learning rate). These networks operate in a batch-processing mode (or an off-line mode), where the entire training data are presented in training epochs until the mean square energy of the network is minimized to a user-defined level by adjusting the weights of the network. These weight adjustments (or learning) are typically based on some form of gradient descent and are prone to be stuck in local minima. Thus, there is no guarantee of network convergence to the desired solution. Further, once the network has been trained, the only way to accommodate new training data is to retrain the network with the old and new training data combined.

Adaptive resonance architectures are neural networks that self-organize stable recognition categories in real time in response to arbitrary sequences of input patterns. The basic principles of adaptive resonance theory (ART) were introduced in Grossberg, "Adaptive pattern classification and universal recoding, II: Feedback, expectation, olfaction, and illusions." *Biological Cybernetics* 23 (1976) 187–202. A class of adaptive resonance architectures has since been characterized as a system of ordinary differential equations by Carpenter and Grossberg, "Category learning and adaptive pattern recognition: A neural network model, *Proceeding of the Third Army Conference on Applied Mathematics and Computing*, ARO Report 86-1 (1985) 37–56, and "A massively parallel architecture for a self-organizing neural pattern recognition machine." *Computer Vision, Graphics, and Image Processing*, 37 (1987) 54–1 15. One implementation of an ART system is presented in U.S. application Ser. No. PCT/US86/02553, filed Nov. 26, 1986 by Carpenter and Grossberg for "Pattern Recognition System".

More recently, a novel neural network called the fuzzy ARTMAP that is capable of incremental approximation of nonlinear functions was proposed by Carpenter et al. in G. A. Carpenter and S. Grossberg, "A massively parallel architecture for a self-organizing neural pattern recognition machine," Computer Vision Graphics, Image Process., Vol. 37, pp. 54–115, 1987. The number of nodes in this network is recruited in a dynamic and automatic fashion depending on the complexity of the function. Further, the network guarantees stable convergence and can learn new training data without the need for retraining on previously presented data. While the fuzzy ARTMAP and its variants have performed very well for classification problems, as well as extraction of rules from large databases, they do not perform very well for function approximation tasks in highly noisy conditions. This problem was addressed by Marriott and Harrison in S. Marriott and R. F. Harrison, "A modified fuzzy artmap architecture for the approximation of noisy mappings," Neural Networks, Vol. 8, pp. 619–41, 1995, by designing a new variant of the fuzzy ARTMAP called the PROBART to handle incremental function approximation problems under noisy conditions. The PROBART retains all of the desirable properties of fuzzy ARTMAP but requires fewer nodes to approximate functions.

Another desirable property of the ANN is its ability to generalize to previously untrained data. While the PROBART network is capable of incremental function approximation under noisy conditions, it does not generalize very well to previously untrained data. The PROBART network has been modified by Srinivasa in N. Srinivasa, "Learning and Generalization of Noisy Mappings Using a Modified PROBART Neural Network," IEEE Transactions on Signal Processing, Vol. 45, No. 10, October 1997, pp. 2533–2550, to achieve a reliable generalization capability. The modified PROBART (M-PROBART) considerably improved the prediction accuracy of the PROBART network on previously untrained data even for highly noisy function approximation tasks. Furthermore, the M-PROBART allows for a relatively small number of training samples to approximate a given mapping, thereby improving the learning speed.

Figure 1:
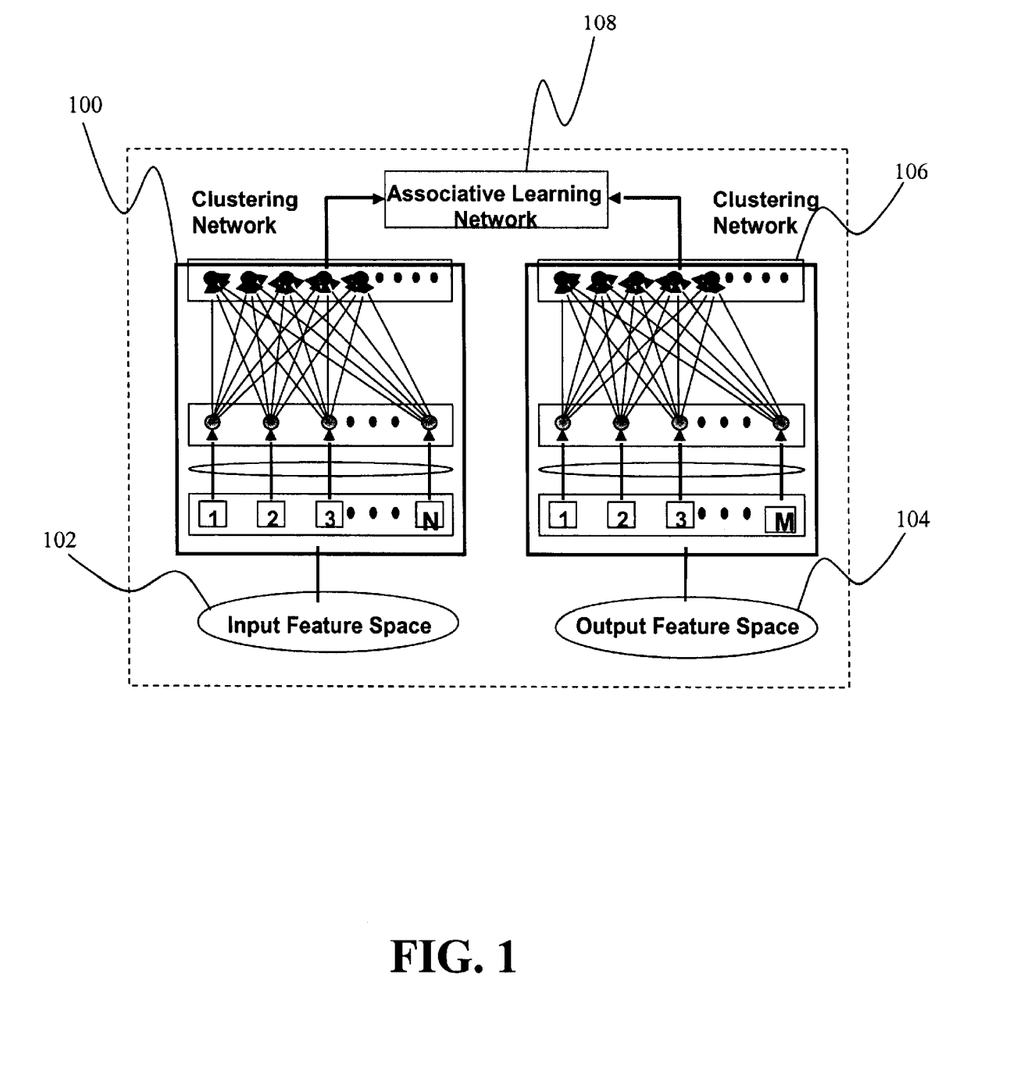
FIG. 1 provides an overview of the structure of the basic M-PROBART neural network.

The modified probability adaptive resonance theory (M-PROBART) neural network algorithm is a variant of the Fuzzy ARTMAP, and was developed to overcome the deficiency of incrementally approximating nonlinear functions under noisy conditions. The M-PROBART neural network is a variant of the adaptive resonance theory (ART) network concept, and consists of two clustering networks connected by an associative learning network. The basic M-PROBART structure is shown in FIG. 1. For any given input-output data pair, the first clustering network 100 clusters the input features, shown in the figure as an input feature space 102 having N features, in the form of hyper-rectangles. The vertices of the hyper-rectangle are defined by the values of the input features and the dimensions of the hyper rectangle are equal to the number of input features. The size of the hyper-rectangle is defined based on the outlier members for each cluster. The corresponding output, shown in the figure as an output feature space 104 having M features, is also clustered by the second clustering network 106 in the form of a hyper-rectangle. An associative learning network 108 then correlates these clusters. The clustering networks 100 and 106 are represented by a series of nodes 110. In the original Fuzzy ARTMAP network, only many-to-one functional mappings were allowed. This implies that many hyper-rectangles that form input clusters could be associated with a single hyper-rectangle on the output side but not the other way around. Further, for any given input, only one cluster (i.e., the maximally active or the best match cluster) was allowed to be active on the input side and a prediction was based on the associated output cluster for that maximally active input cluster. This mode of prediction is called the winner-take-all (WTA) mode of prediction. It has been shown that by replacing the WTA mode of prediction with a distributed mode of prediction combined with allowing one-to-many mappings between the input and output clusters, the M-PROBART was capable of better prediction capabilities than Fuzzy ARTMAP under noisy conditions.

The associative learning network in the M-PROBART has the simple function of counting the frequency of co-occurrence of an input and output cluster. Thus, if an input cluster is very frequently co-active with an output cluster, then the frequency of their association (or the connection between the two clusters) is increased by the associative network to reflect the importance of the association. During prediction, each test input activates several clusters in the input clustering network with activity proportional to the degree of match between the input and each cluster center. This forms a distributed pattern of activity at the input clustering network. This activity is weighted by the strength (or frequency) of its association to a given output cluster to arrive at the most probable output cluster prediction. Another interesting aspect of the M-PROBART algorithm is that each association between an input cluster and output cluster can be directly interpreted as a rule. The firing strengths for each rule is provided by the product of the cluster activity and the frequency of association between the input and output cluster of that rule. While the M-PROBART algorithm is able to outperform the Fuzzy ARTMAP algorithm for both functional approximation and classification tasks, much like the Fuzzy ARTMAP algorithm it has a key drawback in that for high prediction accuracy requirements, the number of input and output clusters formed becomes prohibitively large (order of thousands of rules). Thus, it is impractical to implement for real world problems.

With the increasing functionality of neural networks, the number and variety of applications to which they are applied is also expanding. Neural networks may be applied to pattern recognition applications such as character recognition, speech recognition, remote sensing, automotive occupant sensing, recognition of an object via physical feature sensing, and medical analysis, to name a few. For each of these applications, classification algorithms are available based on different theories and methodologies used in the particular area. In applying a classifier to a specific problem, varying degrees of success with any one of the classifiers may be obtained. To improve the accuracy and success of the classification results, different techniques for combining classifiers have been studied. Nevertheless, problems of obtaining high classification accuracy within a reasonable time exist for the present classifier combination techniques and an optimal integration of different types of information is therefore desired to achieve high success and efficiency. This need is particularly strong in situations that, by their nature, require a high degree of accuracy and a fast classification response, such as automobile safety systems.

To generate a faster, more accurate classification system, combinations of multiple classifiers have been employed in a technique known as boosting. The boosting technique essentially converts a neural network with non-zero error rate into an ensemble of neural networks with significantly lower error rate compared to a single neural network. In early combination techniques, a variety of complementary classifiers were developed and the results of each individual classifier were analyzed by three basic approaches. One approach uses a majority voting principle, where each individual classifier represents a score that may be assigned to one label or divided into several labels. Thereafter, the label receiving the highest total score is taken as the final result. A second approach uses a candidate subset combining and re-ranking approach, where each individual classifier produces a subset of ranked candidate labels, and the labels and the union of all subsets are re-ranked based on their old ranks in each subset. A third approach uses Dempster-Shafer (D-S) theory to combine several individual classifiers. However, none of these approaches achieve the desired accuracy and efficiency in obtaining the combined classification result.

Therefore, it is an object of the present invention to provide a two-stage boosting and pruning approach to both reduce the number of rules formed by the M-PROBART and also considerably improve its prediction accuracy.

References of interest relative to M-PROBART, Fuzzy Artmap, and boosting of neural networks include the following:

1) N. Srinivasa, "Learning and Generalization of Noisy Mappings Using a Modified PROBART Neural Network", *IEEE Transactions on Signal Processing*, vol. 45, no. 10, pp. 2533–2550, October 1997;
2) G. A. Carpenter, S. Grossberg, N. Markuzon, J. H. Reynolds and D. B. Rosen, "Fuzzy Artmap: A Neural Network Architecture for Incremental Supervised Learning of Analog Multidimensional Maps", *IEEE Transactions on Neural Networks*, vol. 3, pp. 698–712, 1992.;
3) H. Drucker, R. Schapire and P. Simard, "Boosting Performance in Neural Networks," *International Journal of Pattern Recognition and Artificial Intelligence*, vol. 7, no. 4, pp. 705–719, 1993.

SUMMARY OF THE PRESENT INVENTION

In accordance with the present invention, a neural network boosting and pruning method is presented, which improves the accuracy of adaptive resonance theory (ART) based networks. A set of training data having inputs with correct classifications corresponding to the inputs is provided. Next, the data is ordered into a plurality of differently ordered data sets, and each of the differently ordered data sets are divided into a plurality of data portions. A plurality of booster networks $B_{x,y}$ is then associated with each of the plurality of differently ordered data sets with x representing a particular booster type and y representing the particular data set with which the particular booster is associated. The first booster network in each data set is then trained using one of the data portions. After training, the first booster network is tested using the data in another data set. Next, a series of booster networks are trained and tested, with each subsequent booster network receiving the mistakes of the previous booster network along with a portion of the correct decisions made by all of the previous booster networks. The number of booster networks utilized depends on the particular application and the necessary classification accuracy. The rules from all of the booster networks of a particular booster type x are then pruned in an intra-booster pruning process, where rules having a sufficient overlap with other rules are eliminated, resulting in a series of intra-booster pruned networks. The rules from intra-booster pruned networks are then pruned in an inter-booster pruning process, similar in operation to the intra-booster pruning process, resulting in a single residual booster. The present invention is preferably embodied using M-PROBART-type booster networks, and utilizes a pair-wise Fuzzy AND operator in the intra and inter-booster pruning processes to eliminate rules having sufficient overlap.

DETAILED DESCRIPTION

The present invention relates to combinations of classifiers such as associative learning networks, as well as to apparatus incorporating them therein. The following description is presented to enable one of ordinary skill in the art to make and use the invention and to incorporate it in the context of particular applications. Various modifications to the preferred embodiment, as well as a variety of uses in different applications will be readily apparent to those skilled in the art, and the general principles defined herein may be applied to other embodiments. Thus, the present invention is not intended to be limited to the embodiments shown, but is to be accorded the widest scope consistent with the principles and novel features disclosed herein.

Figure 2:
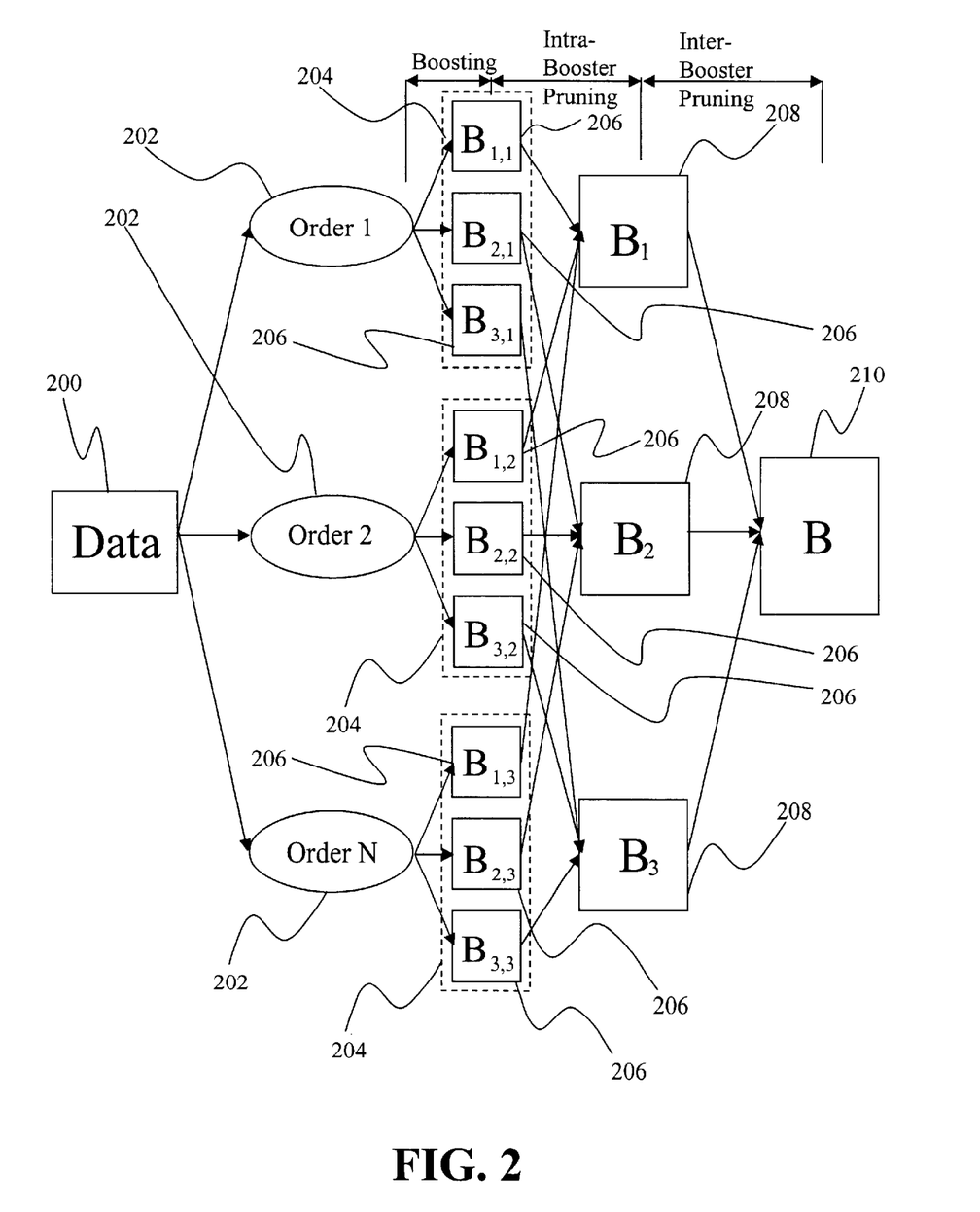
FIG. 2 provides a macroscopic overview of an embodiment of the present invention demonstrating the relationship between the input data and the final set of rules produced.

The present invention describes a highly accurate recognition and position sensing system, and has a wide range of potential applications including automotive occupant sensing, feature and gesture recognition, and in security systems, among many others. To improve accuracy and reliability, the invention modifies a classification system, typically a neural network such as the M-PROBART neural network by providing a boosting and pruning method to enhance the accuracy of its predictions. Although is invention is widely applicable to various classification systems, it will be discussed herein as applied to neural networks. A basic overview of an embodiment of the present invention is shown in FIG. 2. As shown, a set of training data 200 is copied into Y differently ordered data sets 202. The number y is an integer representing a particular one of the Y different ordered data sets 202. Each particular one y of the Y differently ordered data sets 202 is a randomly ordered copy of same set of training data 200. Although the random ordering is generally the preferred method of ordering the data, the data may also be ordered by other methods. It is essential, however, that the data in each particular one y of the Y differently ordered data sets 202 be arranged in an order different than that of the others. Each of the Y differently ordered data sets 202 is provided to a plurality X of booster networks 204 comprised of a set of individual booster networks $B_{x,y}$ 206, where the subscript x is an integer representing the number of the booster type for the particular booster. The number Y, the number of differently ordered data sets 202 also represents the total number of a particular type of booster x within the system. Preferably, the same number of particular booster types X is present for each of the Y differently ordered sets 202. After the boosting process, the set of rules generated from the individual booster networks $B_{x,y}$ 206 of a particular booster particular type x are pruned in an intra-booster pruning process into a set of intra-booster pruned booster networks $B_x$ 208. Subsequently, the rule set from the intra-booster pruned booster networks $B_x$ 208 is further pruned in an inter-booster pruning process into a terminal network 210 which includes the final rule set. The order in which the intra-booster and inter-booster are preformed may be interchanged depending on the particular application. Thus, it is possible to prune all of the rules for a particular plurality X of booster networks 204 prior to pruning the rules for the booster networks of a particular booster type x. In the following description, the boosting and pruning processes are explained in greater detail.

(a) Boosting

Figure 3:
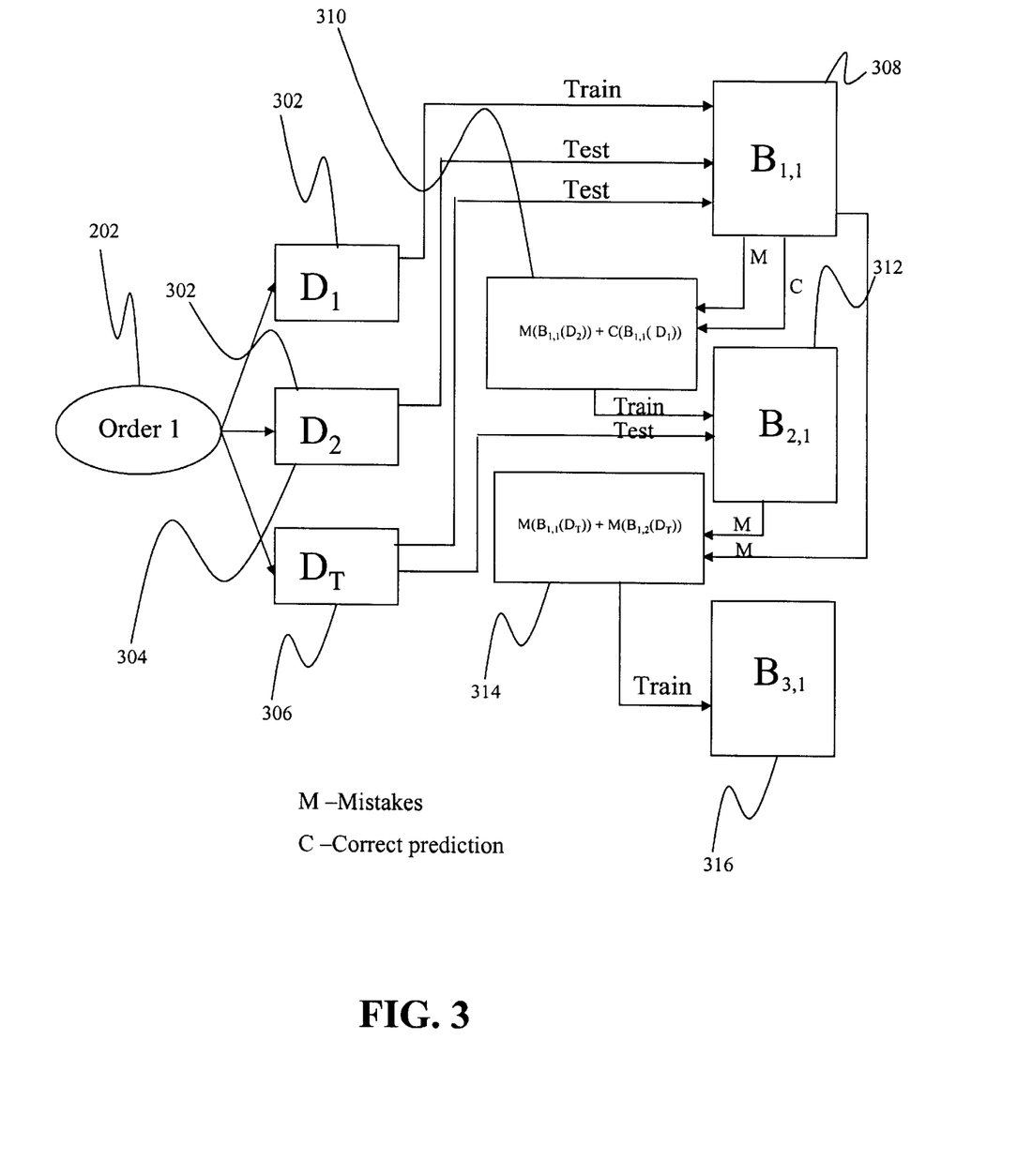
FIG. 3 provides a detailed flowchart of the boosting portion of a three-booster embodiment of the present invention presented in FIG. 2.
Figure 4:
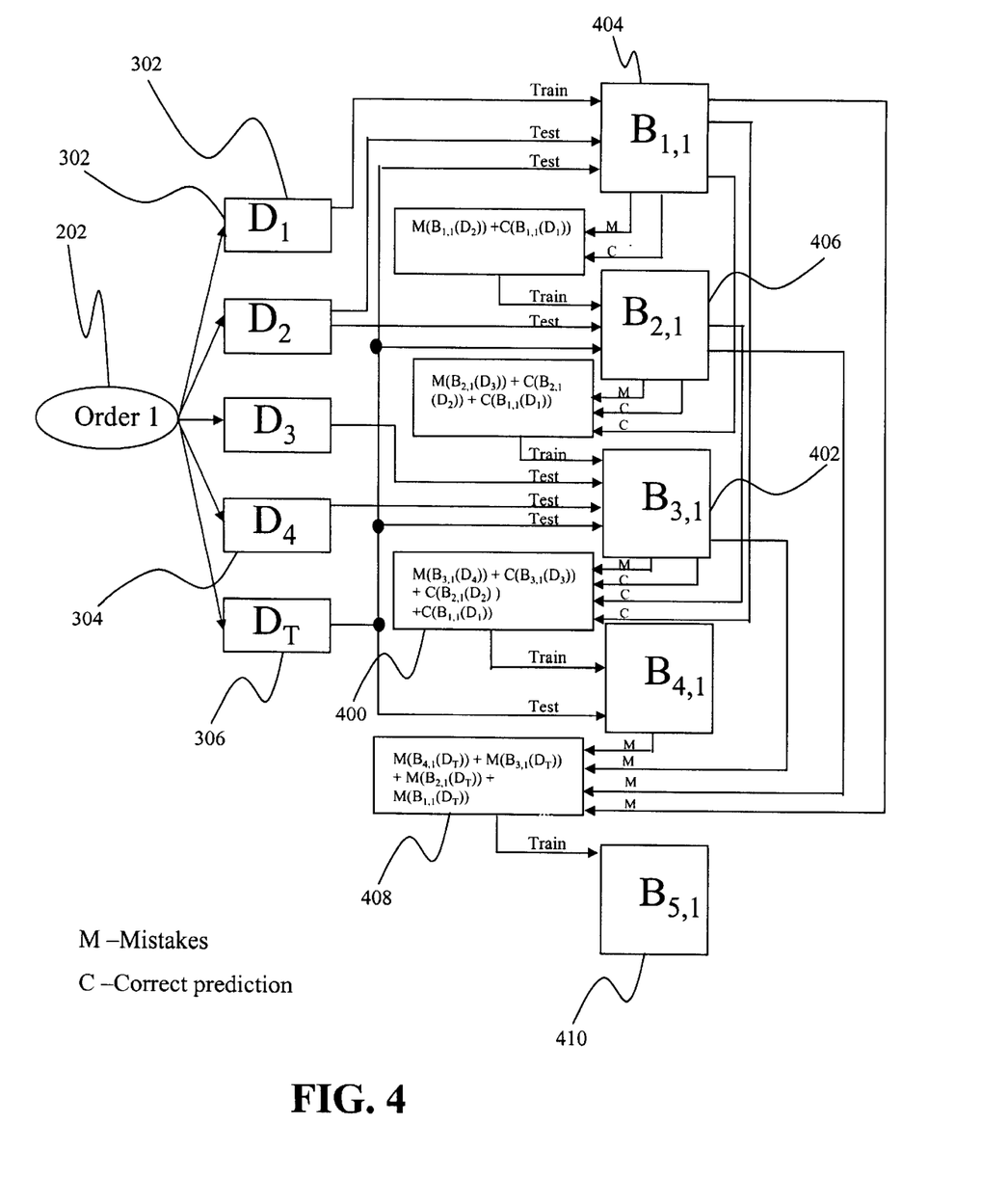
FIG. 4 provides a detailed flowchart of the boosting portion of a five-booster embodiment of the present invention presented in FIG. 2.

The boosting process is shown in detail in FIGS. 3 and 4. FIG. 3 demonstrates an embodiment using a system which results in three boosters, and which the inventors have found to be a preferred embodiment for use in the application of vehicle occupant classification for the controlled deployment of airbags. FIG. 4 provides an expanded embodiment that results in five boosters, and is used as an illustration that, by comparison with FIG. 3, provides a clear picture of the method by which the boosting process may be expanded to provide any number of boosters. By providing a means for tailoring the number of boosters, the present invention may be applied to a wide range of applications. The particular embodiment used for a specific application may be designed to provide a suitable accuracy level.

The booster networks used in the present invention are preferably based on Adaptive Resonance Theory (ART), and are more preferably of the M-PROBART type. In essence, the boosting technique presented here converts a single neural network with a non-zero error rate into an ensemble of neural networks with significantly lower error rate compared to a single neural network. As previously stated, the embodiment shown in FIG. 3 generates three neural network boosters. The three neural networks are generated using one of the Y differently ordered data sets 202, as also shown in FIG. 2. Thus, FIG. 3 represents the boosting operation as applied to a particular one y of the Y differently ordered data sets 202. The particular y differently ordered data set is partitioned into two portions, a first portion $D_1$ 302, a second portion $D_2$ 7529 304. Both portions include data and the associated correct ground truth classifications. A total data set $D_T$ 306 contains all of the data and associated correct classifications from the Y differently ordered data input set 202. Note that the division of the Y differently ordered data sets 202 into two portions is demonstrated for illustration of the preferred embodiment only, and is not intended to limit the present invention. As will be outlined for FIG. 4, the number of portions may be selected based on the needs of a particular embodiment. In this more general case, $D_{n,y}$ represents the number of total data portions for a particular y differently ordered data set, with n being chosen as equal to 2 and 4 for FIGS. 3 and 4, respectively. Note that the division of the data into the n portions does not rely on any particular method or order. However, it is desirable to distribute the data evenly into the n portions based on the classification so that the data samples are evenly distributed among the portions.

In FIG. 3, the data and associated correct classifications of the first portion $D_1$ are used to train the first booster network 308. As previously stated, the division of the data into the n portions does not rely on any particular method or order. Thus, for practical purposes the first portion $D_1$ 302 and the second portion $D_2$ 304 are interchangeable, and are numerically labeled here simply for illustration. After the first booster network 308 is trained, the second portion $D_2$ 304 is passed to the first booster network 308 to determine its mistakes. Next, a first derivative training set 310 is constructed. A portion, preferably half, of the first derivative training set 310 includes data upon which mistakes were made by the first booster network 308 on the second portion 304. The other portion of the first derivative training 310 set includes data and classifications from the first portion $D_1$ 302. The first derivative training set 310 is used to train the second booster network 312. Next, the total data set $D_T$ is passed to both the first booster network 308 and the second booster network 312 to determine their mistakes. The mistakes of the first booster network 308 and the second booster network 312 on the total data set $D_T$ are then combined to form a second derivative training set 314. The second derivative training 314 is then used to train the third booster network 316.

A method by which the number of data portions and booster networks may be expanded is given in FIG. 4. It is important to note that the first data portion is used as a training set for the first booster only and that each of the sequential $D_{n,y}$ portions are run through the booster networks to determine their mistakes. The derivative training sets each include the mistakes of the previous booster and a preferably equal portion of data upon which all of the previous boosters arrived at correct classifications. Thus, for example, the third derivative training set 400 receives the mistakes of the previous booster network 402 along an equal portion of data upon with correct decisions were made by the first three booster networks, 404, 406, and 402, respectively. As stated previously, the amounts of data upon which correct decisions were made is matched class-wise to the amount of data upon which mistakes were made.

In order to characterize the contents of each subsequent derivative training set, the following method is useful. First, the mistakes of the previous booster are included, along with a, preferably but not necessarily, equal portion of data upon which prior boosters arrived at correct classifications. The first booster in the system is always unique, as the correct classifications from the first data portion are arrived at through training rather than testing. These correct classifications are the result of system initialization with the first training set, so it is not completely accurate to generally label them correct "decisions" (although in some cases they may be). Thus, these classifications may also be labeled "initialization" classifications. Each of the mistakes, initialization classifications, and correct classifications has an associated weight, which indicate the portion of data received from that classification as opposed to others. The formula by which the contents of the training sets for a particular order may be determined is thus, $$T_{x,y} = (w_{1,x,y})M(B_{x,y}(D_{x+1,y})) + \\ (w_{2,x,y})C(B_{1,y}(D_{1,y})) + \sum_{j=1}^{x-1(x-1>0)} (w_{2+j,x,y})C(B_{x-j+1,y}(D_{x-j+1,y}))$$

where:

y represents the a particular one of the Y differently ordered data sets;

x represents a particular booster network type within the plurality X of booster networks associated with a particular one of the Y differently ordered data sets;

i represents the training set level;

j is a summation index which ranges from 1 to x−1 where x−1>0 (j represents the total number of booster networks $B_{x,y}$ from which correct examples are used for the particular training set $T_{x,y}$;

y represents the data order;

$T_{x,y}$ is the contents of the training data used in the ith training set;

w represents independently selectable apportionment factors which apportion the amount of data upon which mistakes were made and the amount of data for which correct classifications were made;

$M(B_{x,y}(\bullet))$ represents data upon which a mistake was made by the previous booster network;

$C(B_{x,y}(\bullet))$ represents data that was properly classified by a particular booster;

$B_{x,y}$ represents the booster from which the data originated; and

D represents the portion of data that was used.

Note that the second term in the equation, namely $(W_{2,x,y})C(B_{1,y}(D_{1,y}))$ is the term related to what could be called the "initialization" classifications.

Preferably, the weights are chosen such that the weight applied to the data upon which mistakes were made is equal to the sum of the weights applied to the initialization data and the properly classified data. Furthermore, it is desirable to choose the weights of the initialization data and the weights of the properly classified data such that they are all equal.

Also, as with the illustration in FIG. 3, the total data set $D_T$ is then distributed to all of the booster networks, with all of their mistakes being collected in a derivative training set 408 in order to train the terminal booster 410.

Referring back to FIG. 2, each of the Y differently ordered data sets 202 of data is used to develop a set of boosters as outlined in FIG. 3. In the preferred embodiment as used in vehicle occupant classification systems, a total of Y=5 differently ordered data sets 202 of data, each used to develop three booster networks of the M-PROBART variety, has been found to provide sufficient classification accuracy for "smart" airbag deployment. This is because M-PROBART networks are incremental learning networks that learn a given input as it is presented (in other words, only one pass through the dataset is required). As a result, the cluster structure depends significantly on the order of data input presentation. When a given training data set is presented to two M-PROBART neural networks with different input orderings, two cluster structures in the input and output clustering networks, and corresponding output predictions may differ, even if the accuracy of the two networks is the same. Overall prediction accuracy can benefit from this order dependence though a simple voting strategy where, for the test input, the prediction with the largest number of votes from among all of the M-PROBART networks is the final prediction. Voting tends to improve performance by canceling errors of the networks near noisy regions or decision boundaries while at the same time providing a measure of certainty for a given prediction. Although the discussion in this paragraph has discussed the boosting networks in the context of M-PROBART networks, other types of networks may be equally applicable. Using an ensemble of three booster networks, the ensemble is prohibitively large and requires significant computation power to arrive at a prediction for any given test input. To overcome this problem, a two-stage pruning procedure, consisting of intra-booster pruning and inter-booster pruning is used. These stages will be discussed in detail below.

(b) Intra-Booster Pruning and Inter-Booster Pruning

Figure 5:
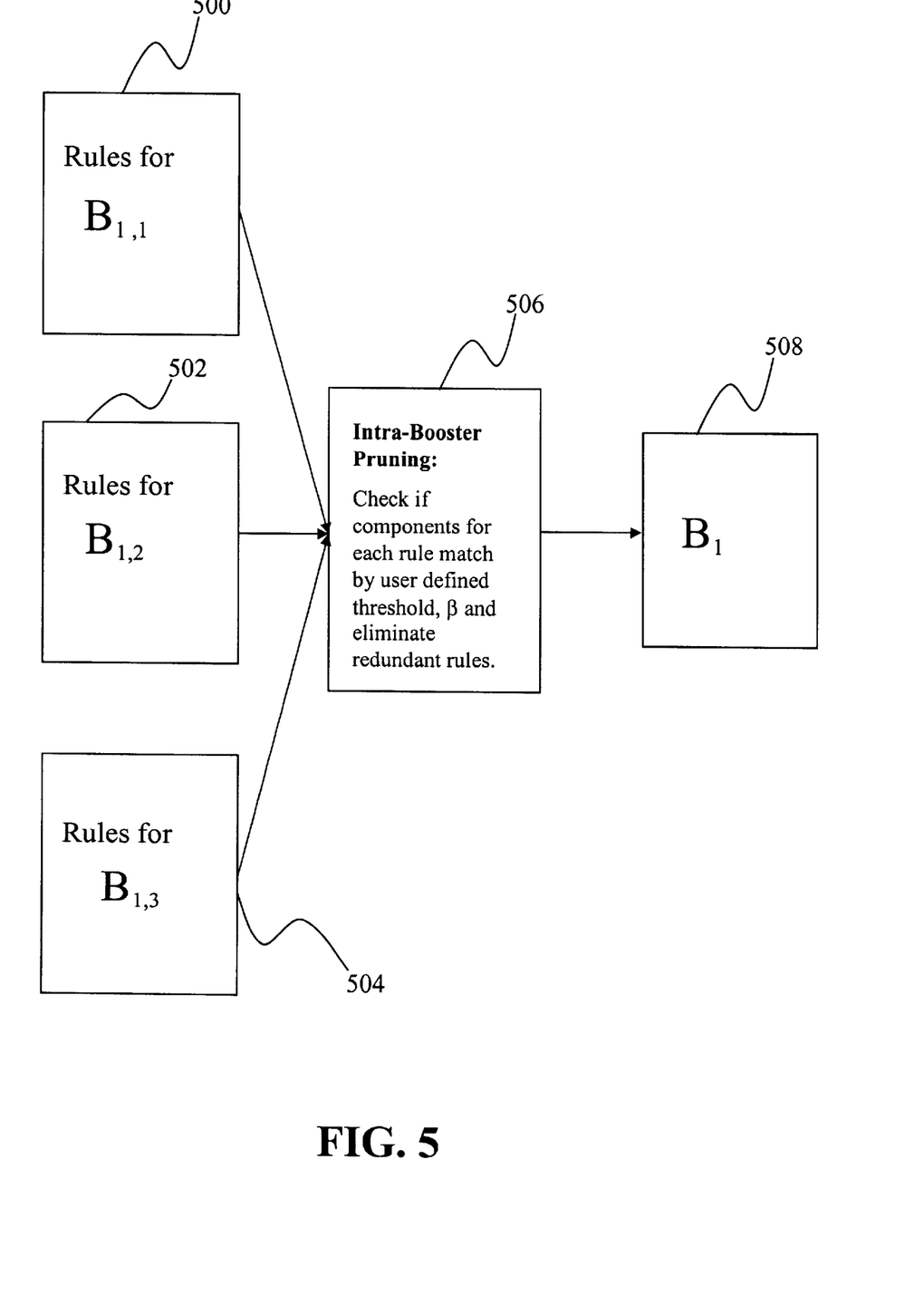
FIG. 5 demonstrates the intra-booster pruning aspect of the embodiment of the present invention presented in FIG. 2.
Figure 6:
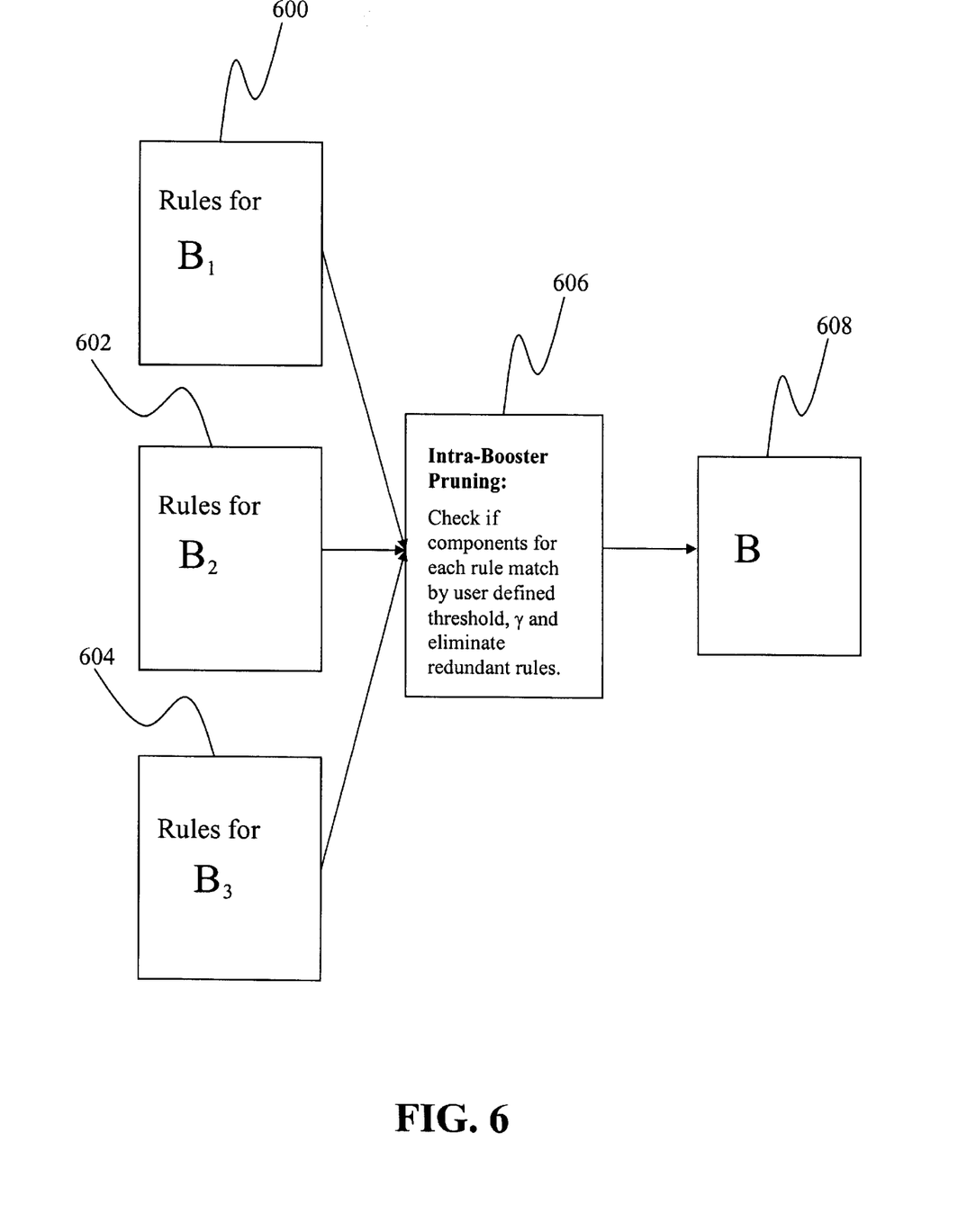
FIG. 6 demonstrates the inter-booster pruning aspect of the embodiment of the present invention presented in FIG. 2.

The pruning component of the present invention helps to extract the essence of the learned knowledge from the ensemble of networks and results in a significant reduction in network size, but does not degrade the improvements in prediction accuracy due to boosting. Referring to FIG. 2, in the first stage of pruning, called intra-booster pruning, the rules generated by the equivalent booster networks from each set of boosters ($B_{x,y}$ across the y particular ordered data sets where x is held constant), are pruned into a smaller set of rules, which yield essentially the same accuracy as the un-pruned set of rules. Although illustrated as a set of three booster networks 500, 502, and 504 in FIG. 5, this method could be applied to any number of equivalent booster networks. This is demonstrated in FIG. 2 by the arrowed connections between the boosters in the boosting process 204 and the boosters generated by the first pruning operation 206. FIG. 5 further illustrates this process with a set of three equivalent booster networks 500, 502, and 504 in FIG. 5, an intra-booster pruning process 506, and a final, pruned rule set 508. However, this method could be applied to any number of equivalent booster networks. The rules generated by the booster networks for a given class take the following form:

Rule 1: If $F_1$ is $W_{1,1}$ AND $F_2$ is $W_{2,1}$ AND ... $F_n$ is $W_{n,1}$, then the class of Rule 1 is $C_m$;

Rule R: If $F_1$ is $W_{1,R}$ AND $F_2$ is $W_{2,R}$ AND ... $F_n$ is $W_{n,1}$, then the class of Rule 2 is $C_m$, where $F_n$ is a given input feature, $W_{f,R}$ is a scalar weight associated with a particular feature in a given rule to generate a particular classification output $C_m$, f is the particular feature for which the weight is assigned, and R is the particular rule for a given booster type. The rules are grouped into pruning groups by their resulting classifications. Each of the rules in each pruning group is checked with the other rules in the same pruning group in a pair wise manner to determine if it overlaps sufficiently with one or more of the other rules to justify being pruned from the pruning group, and thereby eliminate it from the set of rules. The order in which the rules are checked in the pair wise manner is generally arbitrary, but may be set in a particular manner for a particular application. During the pair wise pruning process, the relationship used to determine rule overlap is chosen based on the particular type of neural network used for the boosting process. With M-PROBART neural networks as the boosters, the preferred relationship tested is whether:

$|W_i \Lambda W_j| > \beta$ for two rules, $i$, and $j$ that have the same output class, $C_m$, where $\Lambda$ is the fuzzy AND operation and $|\bullet|$ corresponds to the summation over all of the features of the weight vectors. The fuzzy AND operator essentially computes a component-wise minimum of the weights $W_i$ and $W_j$. If the inequality is satisfied, and both rules include the same output class, $C_m$, then one of the rules may be pruned. The threshold value $\beta$ is a user-set constant that is selected to cause pruning for rules with a particular level of overlap. The number of remaining pruned booster rule sets is equal to the number of types of booster networks.

The inter-booster pruning stage uses the same method as described for intra-booster pruning. In this stage, the rule sets from the remaining pruned booster rule sets are pruned into a residual booster. With M-PROBART neural networks as the boosters, the threshold value $\beta$ in the relationship may be set independently of that from used in the relationship from the first pruning stage, and is denoted in FIG. 6 as $\gamma$ to further illustrate this independence. In FIG. 6, 600, 602, and 604 illustrates the intra-booster pruned networks, while the inter-booster pruning process and the residual booster are represented by 606 and 608, respectively. As with the intra-booster pruning process, the inter-booster pruning process may be applied to any number of boosters.

Once the intra-booster and intra-booster pruning has been completed, the remaining residual neural network comprises the essence of the boosters generated during the boosting process, yet includes only a fraction of the rules. Thus, multiple neural networks have been used to boost accuracy over that available with a single neural network by generating a larger, more complete set of rules, and then the larger set has been pruned for overlaps to yield a single residual neural network with a high degree of accuracy. The final result is a highly accurate learning system.

The present invention has been applied in the context of automotive occupant recognition and position sensing algorithms.

Performance evaluations have been conducted using one-dimensional infrared range profile sensor data for smart airbag applications in automobiles. The sensor data contained forty features: twenty beams with range information of the occupant in the seat measured from a fixed location in the car and twenty additional signals measured at each beam location to provide a measure of the strength/intensity of the signal reflected from the car seat back to the sensor. Two separate data sets were initially collected on an automobile using these sensor features. In the first set, called occupant recognition data, the classification task was to decide whether to enable or disable an airbag based on the type of occupant. For example, the airbag should be disabled if a rear-facing infant seat was placed on the seat. In the second set, called occupant position data, the classification task remains the same but now is based on the position of the occupant with respect to the instrument panel in front of the seat. For example, if the occupant is too close to the panel, the decision must be to disable the airbag, and if the occupant is sufficiently far from the panel, the decision must be to enable the airbag. The present invention has been applied to these classification tasks.

Figure 7:
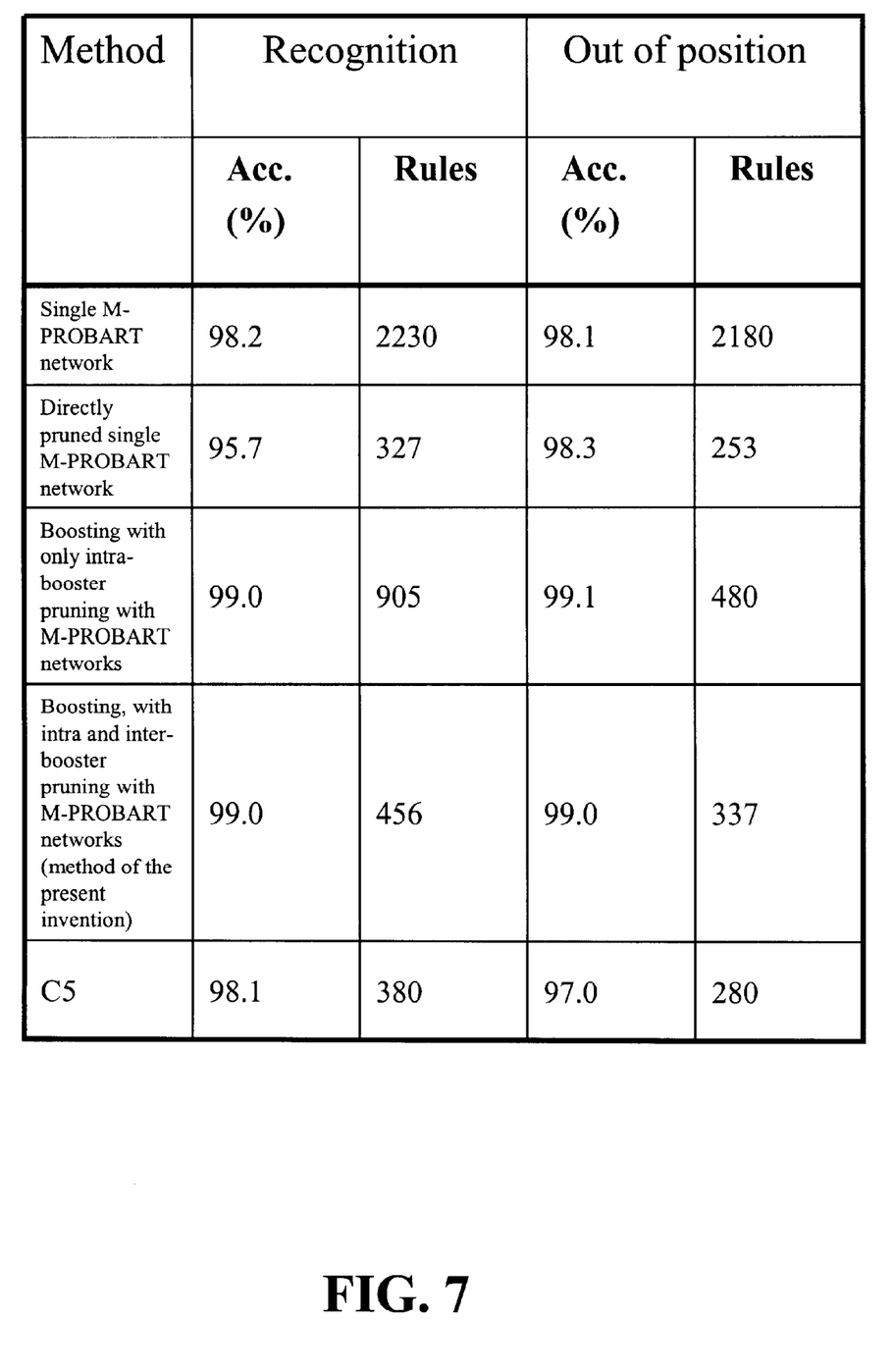
FIG. 7 presents a table showing the performance a three-booster M-PROBART embodiment the present invention as applied to automotive occupant sensing in comparison with a single M-PROBART neural network, a single M-PROBART neural network with direct pruning, a three-booster M-PROBART embodiment with one pruning stage, and with the commercially available decision tree program, C5.

The performance of the present invention in the sensing and recognition tasks discussed above is summarized in FIG. 7. Two indices were used to evaluate performance. The first index was accuracy in prediction performance on test data (i.e. not the training data set). It can be seen from FIG. 7 that the accuracy of prediction on the test set from the present invention was better than that from a single M-PROBART network, than that resulting from directly pruning the rules of the single M-PROBART network without boosting, and than that resulting from boosting with only intra-booster pruning for both the data sets. The second index used was the number of rules (i.e., the number of nodes). The present invention reduces the number of rules by a factor of five when compared to a single M-PROBART network. In summary, these rules demonstrate the benefits of the present invention as compared to other network methods. The present invention also generated higher recognition rates than decision trees generated by the commercial program C5 with a comparable number of rules.

What is claimed is:

1. A neural network classifier boosting and pruning method including the steps of:
   (a) providing a set of training data having inputs with correct classifications corresponding to the inputs;
   (b) ordering the set of training data into a plurality Y of differently ordered data sets, where Y is the total number of differently ordered data sets and y represents a particular one of the Y differently ordered data sets;
   (c) dividing each of the Y differently ordered data sets into a set of N particular data portions $D_{n,y}$ where N represents the total number of data portions into which the particular data set y was divided and n identifies a particular data portion among the N data portions derived from a particular data set y;
   (d) associating a plurality X,y of booster classifiers $B_{x,y}$ for each particular data set y, where X represents the total number of booster types associated with each particular data set y and x represents a particular booster type, the plurality X,y of booster classifiers $B_{x,y}$ for each particular data set y including a terminal booster;
   (e) training one of each plurality X,y of booster classifiers $B_{x,y}$ with a particular data portion $D_{n,y}$, resulting in a plurality of rules;
   (f) testing the booster classifier $B_{x,y}$, trained in step (e) utilizing another particular data portion, $D_{n,y}$, said testing resulting in correctly classified data and mistakenly classified data;
   (g) creating a particular training data set $T_{x,y}$ corresponding to each particular data set y, the contents of which are defined by:

$$T_{x,y} = (w_{1,x,y})M(B_{x,y}(D_{x+1,y})) +$$
$$(w_{2,x,y})C(B_{1,y}(D_{1,y})) + \sum_{j=1}^{x-1(x-1>0)} (w_{2+j,x,y})C(B_{x-j+1,y}(D_{x-j+1,y}))$$

where $M(B_{x,y}(\bullet))$ identifies data upon which mistakes were made by the associated booster classifier $B_{x,y}$, $C(B_{x,y}(\bullet))$ identifies data for which correct classifications were made by the associated booster classifier $B_{x,y}$, and w represents independently selectable apportionment factors which apportion the amount of mistakenly classified data and the amount of correctly classified data, and j is a summation index which ranges from 1 to x−1 where x−1>0 and represents the total number booster classifiers $B_{x,y}$ from which correct examples are used for the particular training set $T_{x,y}$;
   (h) training one of the plurality X,y of booster classifiers $B_{x,y}$ associated with each particular data set y with the particular training data set $T_{x,y}$ created in step (g) which corresponds to the same particular data set y, resulting in a plurality of rules;
   (i) testing the booster classifier $B_{x,y}$ trained in step (h) utilizing another particular data portion $D_{n,y}$ from the same particular data set y, said testing resulting in correctly classified data and mistakenly classified data;
   (j) repeating steps (g) through (i) X−3 additional times until a total of X−1 booster classifiers $B_{x,y}$ have been trained and tested for each particular data set y;
   (k) testing the X−1 booster classifiers $B_{x,y}$ trained in steps (e) through (j) for each particular data set y utilizing the particular data portion y associated with each X−1 booster classifiers $B_{x,y}$, said testing resulting in correctly classified data and mistakenly classified data;
   (l) creating a residual training set $T_{R,y}$ for each particular data set y including the mistakenly classified data resulting from step (k);
   (m) training the terminal booster for each particular data set y utilizing the residual training set $T_{R,y}$ created in step (l); resulting in a plurality of rules for use in a classification apparatus for receiving data for classification and, based on the classficiation data, outputting classfications.

2. A neural network classifier boosting and pruning method as set forth in claim 1, further including the steps of:
   (n) pruning the rules of all of the booster classifiers $B_{x,y}$ of a particular booster type x by eliminating those rules which are sufficiently similar in an intra-booster pruning stage, and resulting in a series of intra-booster pruned classifiers $B_x$;
   (o) pruning the rules of all of the intra-booster pruned classifiers B by eliminating those rules which are sufficiently similar in an inter-booster pruning stage, resulting in a single residual booster B.

3. A neural network classifier boosting and pruning method as set forth in claim 2, wherein the intra-booster pruning step (n) and the inter-booster pruning step (o) utilize the operation, $$|w_i \wedge w_j| > \beta \text{ for all rules which have the same classifications,}$$

where i and j designate two different rules, the rules having a plurality of features, and each one of the plurality of features having an associated particular and independent weight w, where Λ is the fuzzy AND operation, where |•| corresponds to the pair-wise summation over all of the features of the weight vectors, and where β represents a user-chosen constant which determines the level of similarity between two rules which triggers pruning.

4. A neural network classifier boosting and pruning apparatus created by the method of claim 2.

5. A neural network classifier boosting and pruning method as set forth in claim 3, wherein the user-chosen constant β is independently selectable for the inter-booster pruning step (n) and the inter-booster pruning step (o).

6. A neural network classifier boosting and pruning apparatus created by the method of claim 3.

7. A neural network classifier boosting and pruning method as set forth in claim 5, wherein the booster classifiers $B_{x,y}$ are M-PROBART neural networks.

8. A neural network classifier boosting and pruning apparatus created by the method of claim 5.

9. A classifier boosting and pruning apparatus created by the method of claim 7.

10. A neural network classifier boosting and pruning method as set forth in claim 1, further including the steps of:
  (n) pruning the rules of all of the classifier boosters $B_{x,y}$ for each particular data set y by eliminating those rules which are sufficiently similar in an inter-booster pruning stage, resulting in a series of inter-booster pruned classifiers $B_y$,
  (o) pruning the rules of all of the inter-booster pruned classifiers $B_y$ by eliminating those rules which are sufficiently similar in an intra-booster pruning stage, resulting in a single residual booster B.

11. A neural network classifier boosting and pruning method as set forth in claim 10, wherein the inter-booster pruning step (n) and the intra-booster pruning step (o) utilize the operation, $$|w_i \wedge w_j| > \beta \text{ for all rules which have the same classifications,}$$

where i and j designate two different rules, the rules having a plurality of features, and each one of the plurality of features having an associated particular and independent weight w, where $\wedge$ is the fuzzy AND operation, where $|\bullet|$ corresponds to the pair-wise summation over all of the features of the weight vectors, and where $\beta$ represents a user-chosen constant which determines the level of similarity between two rules which triggers pruning.

12. A neural network classifier boosting and pruning apparatus created by the method of claim 10.

13. A neural network classifier boosting and pruning method as set forth in claim 11, wherein the booster classifiers $B_{x,y}$ are M-PROBART neural networks.

14. A neural network classifier boosting and pruning apparatus created by the method of claim 11.

15. A neural network classifier boosting and pruning apparatus created by the method of claim 13.

16. A neural network classifier boosting and pruning apparatus created by the method of claim 1.

17. A neural network classifier boosting and pruning method for position and recognition sensing and classification including the steps of:
  (a) providing a set of training data having inputs with correct classifications corresponding to the inputs;
  (b) ordering the set of training data into a plurality Y of differently ordered data sets, where Y is the total number of differently ordered data sets and y represents a particular one of the Y differently ordered data sets;
  (c) dividing each of the Y differently ordered data sets into a set of N particular data portions $D_{n,y}$, where N represents the total number of data portions into which the particular data set y was divided and n identifies a particular data portion among the N data portions derived from a particular data set y;
  (d) associating a plurality X,y of booster classifiers $B_{x,y}$ for each particular data set y, where X represents the total number of booster types associated with each particular data set y and x represents a particular booster type, the plurality X,y of booster classifiers $B_{x,y}$ for each particular data set y including a terminal booster;
  (e) training one of each plurality X,y of booster classifiers $B_{x,y}$ with a particular data portion $D_{n,y}$ resulting in a plurality of rules;
  (f) testing the booster classifier $B_{x,y}$ trained in step (e) utilizing another particular data portion $D_{x,y}$, said testing resulting in correctly classified data and mistakenly classified data;
  (g) creating a particular training data set $T_{x,y}$ corresponding to each particular data set y, the contents of which are defined by:

$$T_{x,y} = (w_{1,x,y}) M(B_{x,y}(D_{x+1,y})) + \\ (w_{2,x,y}) C(B_{1,y}(D_{1,y})) + \sum_{j=1}^{x-1(x-1>0)} (w_{2+j,x,y}) C(B_{x-j+1,y}(D_{x-j+1,y}))$$

where $M(B_{x,y}(\bullet))$ identifies data upon which mistakes were made by the associated booster classifier $B_{x,y}$, $C(B_{x,y}(\bullet))$ identifies data for which correct classifications were made by the associated booster classifier $B_{x,y}$, and w represents independently selectable apportionment factors which apportion the amount of mistakenly classified data and the amount of correctly classified data, and j is a summation index which ranges from 1 to x−1 where x−1>0 and represents the total number booster classifiers $B_{x,y}$ from which correct examples are used for the particular training set $T_{x,y}$;
  (h) training one of the plurality X,y of booster classifiers $B_{x,y}$ associated with each particular data set y with the particular training data set $T_{x,y}$ created in step (g) which corresponds to the same particular data set y, resulting in a plurality of rules;
  (i) testing the booster classifier $B_{x,y}$ trained in step (h) utilizing another particular data portion $D_{n,y}$ from the same particular data set y, said testing resulting in correctly classified data and mistakenly classified data;
  (j) repeating steps (g) through (i) X−3 additional times until a total of X−1 booster classifiers $B_{x,y}$ have been trained and tested for each particular data set y;
  (k) testing the X−1 booster classifiers $B_{x,y}$ trained in steps (e) through (j) for each particular data set y utilizing the particular data portion y associated with each X−1 booster classifiers $B_{x,y}$ said testing resulting in correctly classified data and mistakenly classified data;
  (l) creating a residual training set $T_{R,y}$ for each particular data set y including the mistakenly classified data resulting from step (k);
  (m) training the terminal booster for each particular data set y utilizing the residual training set $T_{R,y}$ created in step (l); resulting in a plurality of rules for receiving position and recognition related data and outputting highly accurate recognition and position sensing and classification information.

18. A neural network classifier boosting and pruning method as set forth in claim 17, further including the steps of:
  (n) pruning the rules of all of the booster classifiers $B_{x,y}$ of a particular booster type x by eliminating those rules which are sufficiently similar in an intrabooster pruning stage, and resulting in a series of intra-booster pruned classifiers $B_x$;
  (o) pruning the rules of all of the intra-booster pruned classifiers $B_x$ by eliminating those rules which are sufficiently similar in an inter-booster pruning stage, resulting in a single residual booster B.

19. A neural network classifier boosting and pruning method as set forth in claim 18, wherein the intra-booster pruning step (n) and the inter-booster pruning step (o) utilize the operation, $|w_i \Lambda w_j| > \beta$ for all rules which have the same classifications, where I and j designate two different rules, the rules having a plurality of features, and each one of the plurality of features having an associated particular and independent weight w, where $\Lambda$ is the fuzzy AND operation, where $|\bullet|$ corresponds to the pair-wise summation over all of the features of the weight vectors, and where $\beta$ represents a user-chosen constant which determines the level of similarity between two rules which triggers pruning.

20. A neural network classifier boosting and pruning apparatus created by the method of claim 18, for use in highly accurate recognition and position sensing and classification of occupants in an automotive airbag system.

21. A neural network classifier boosting and pruning method as set forth in claim 19, wherein the user-chosen constant $\beta$ is independently selectable for the inter-booster pruning step (n) and the inter-booster pruning step (o).

22. A neural network classifier boosting and pruning apparatus created by the method of claim 19, for use in highly accurate recognition and position sensing and classification of occupants in an automotive airbag system.

23. A neural network classifier boosting and pruning method as set forth in claim 21, wherein the booster classifiers $B_{x,y}$ are M-PROBART neural networks.

24. A neural network classifier boosting and pruning apparatus created by the method of claim 21, for use in highly accurate recognition and position sensing and classification of occupants in an automotive airbag system.

25. A neural network classifier boosting and pruning apparatus created by the method of claim 23, for use in highly accurate recognition and position sensing and classification of occupants in an automotive airbag system.

26. A neural network classifier boosting and pruning method as set forth in claim 17, further including the steps of:

(n) pruning the rules of all of the classifier boosters $B_{x,y}$ for each particular data set y by eliminating those rules which are sufficiently similar in an interbooster pruning stage, resulting in a series of inter-booster pruned classifiers $B_y$, (o) pruning the rules of all of the inter-booster pruned classifiers $B_y$ by eliminating those rules which are sufficiently similar in an intra-booster pruning stage, resulting in a single residual booster B.

27. A neural network classifier boosting and pruning method as set forth in claim 26, wherein the inter-booster pruning step (n) and the intra-booster pruning step (o) utilize the operation, $|w_i \Lambda w_j| > \beta$ for all rules which have the same classifications, where I and j designate two different rules, the rules having a plurality of features, and each one of the plurality of features having an associated particular and independent weight w, where $\Lambda$ is the fuzzy AND operation, where $|\bullet|$ corresponds to the pair-wise summation over all of the features of the weight vectors and where $\beta$ represents a user-chosen constant which determines the level of similarity between two rules which triggers pruning.

28. A neural network classifier boosting and pruning apparatus created by the method of claim 26, for use in highly accurate recognition and position sensing and classification of occupants in an automotive airbag system.

29. A neural network classifier boosting and pruning method as set forth in claim 27, wherein the booster classifiers $B_{x,y}$ are M-PROBART neural networks.

30. A neural network classifier boosting and pruning apparatus created by the method of claim 27, for use in highly accurate recognition and position sensing and classification of occupants in an automotive airbag system.

31. A neural network classifier boosting and pruning apparatus created by the method of claim 29, for use in highly accurate recognition and position sensing and classification of occupants in an automotive airbag system.

32. A neural network classifier boosting and pruning apparatus created by the method of claim 17, for use in highly accurate recognition and position sensing and classification of occupants in an automotive airbag system.

* * * * *